US012780059B2

(12) United States Patent
Chen

(10) Patent No.: US 12,780,059 B2
(45) Date of Patent: Nov. 3, 2026

(54) CLAMPING HOOK STRUCTURE AND SEATING DEVICE CLAMPING INCLUDING THE SAME

(71) Applicant: BAMBINO PREZIOSO SWITZERLAND AG, Steinhausen (CH)

(72) Inventor: Yingzhong Chen, Dongguan (CN)

(73) Assignee: BAMBINO PREZIOSO SWITZERLAND AG, Steinhausen (CH)

( * ) Notice: Subject to any disclaimer, the term of this patent is extended or adjusted under 35 U.S.C. 154(b) by 383 days.

(21) Appl. No.: 18/561,808

(22) PCT Filed: May 17, 2022

(86) PCT No.: PCT/EP2022/063356

§ 371 (c)(1),
(2) Date: Nov. 17, 2023

(87) PCT Pub. No.: WO2022/243335

PCT Pub. Date: Nov. 24, 2022

(65) Prior Publication Data

US 2024/0239251 A1 Jul. 18, 2024

(30) Foreign Application Priority Data

May 17, 2021 (CN) ......................... 202110533326.0

(51) Int. Cl.
*B60N 2/28* (2006.01)

(52) U.S. Cl.
CPC ......... *B60N 2/2887* (2013.01); *B60N 2/2821* (2013.01); *B60N 2/2842* (2013.01); *B60N 2/286* (2013.01)

(58) Field of Classification Search
CPC .... B60N 2/2821; B60N 2/286; B60N 2/2824; B60N 2/2827; B60N 2/289; B60N 2/2893; B60N 2/2863; B60N 2/2857
See application file for complete search history.

(56) References Cited

U.S. PATENT DOCUMENTS 8,070,228 B2 * 12/2011 Karremans .......... B60N 2/2821
297/256.16
2010/0207436 A1 8/2010 Karremans et al.
(Continued)

FOREIGN PATENT DOCUMENTS

AU 2003213303 A1 2/2004
CN 103568893 A 2/2014
(Continued)

OTHER PUBLICATIONS

Japanese Application No. 2023-571258; Office Action with English translation dated Dec. 3, 2024; 14 pages.
(Continued)

*Primary Examiner* — Syed A Islam
(74) *Attorney, Agent, or Firm* — CANTOR COLBURN LLP

(57) ABSTRACT

A clamping hook structure for assembling and connecting a base to a crossbar, the clamping hook structure includes: a bracket, fixed to base, having two opposite side walls; a clamping hook, pivotally connected to the bracket through a clamping hook pivot set up between the two side walls, so as to be pivoted between a locked position and an unlocked position, the clamping hook has a protruding first hook portion and an engaging portion located between the first hook portion and the clamping hook pivot, when the clamping hook is in the locked position or the unlocked position, the first hook portion fixes or releases the crossbar; and a first elastic member, one end of the first elastic member is fixed to the bracket, and the other end of the first elastic
(Continued)

member is fixed to the engaging portion, thus being able to be displaced between the locked position and the unlocked position as the clamping hook is pivoted.

20 Claims, 22 Drawing Sheets

(56) References Cited

U.S. PATENT DOCUMENTS

| | | | |
|---|---|---|---|
| 2011/0243653 | A1 | 10/2011 | Buckingham et al. |
| 2019/0315464 | A1 | 10/2019 | Ciesielczyk et al. |

FOREIGN PATENT DOCUMENTS

| | | | | | |
|---|---|---|---|---|---|
| CN | 103818276 | A | | 5/2014 | |
| CN | 103568893 | B | | 12/2016 | |
| CN | 104290621 | B | * | 9/2017 | ........... B60N 2/2821 |
| CN | 107585065 | A | | 1/2018 | |
| GB | 2554144 | A | * | 3/2018 | ........... B60N 2/2821 |
| JP | H01242805 | A | | 9/1989 | |
| JP | 2008296692 | A | | 12/2008 | |
| JP | 2011006937 | A | | 1/2011 | |
| WO | 2020177387 | A1 | | 9/2020 | |
| WO | 2022123048 | A1 | | 6/2022 | |

OTHER PUBLICATIONS

AU 3rd Office Action; Application No. 2022277525; Date Mailed: Sep. 3, 2025; pp. 1-10.
EP Communication Pursuant to Article 94(3) EPC; Application No. 22 729 569.8-1009; Date Mailed: Sep. 3, 2025; pp. 1-7.
AU 2nd Office Action; Application No. 2022277525; Date Mailed: May 14, 2025; pp. 1-7.
CA 1st Office Action; Application No. 3,219,308; Date of Mailing: Jun. 27, 2025; pp. 1-6.
International Search Report for International Application No. PCT/EP2022/063356; International Filing Date: May 17, 2022; Date of Mailing: Aug. 22, 2022; 3 pages.
Taiwanese Application No. 11220880270; Taiwanese Office Action dated Sep. 7, 2023; 9 pages.
Written Opinion for International Application No. PCT/EP2022/063356; International Filing Date: May 17, 2022; Date of Mailing: Aug. 22, 2022; 5 pages.

* cited by examiner

CLAMPING HOOK STRUCTURE AND SEATING DEVICE CLAMPING INCLUDING THE SAME

CROSS REFERENCE TO RELATED APPLICATIONS

This application is a National Stage Application of PCT/EP2022/063356, filed May 17, 2022, which claims the benefit of Chinese Application 202110533326.0, filed on May 17, 2021, entitled "CLAMPING HOOK STRUCTURE AND SEATING DEVICE CLAMPING INCLUDING THE SAME", the contents of which are herein incorporated by reference in their entireties as if fully set forth.

TECHNICAL FIELD

The present disclosure relates to a clamping hook structure and a seating device including the clamping hook structure.

BACKGROUND

Seating devices such as child car seats and carrycots are common devices which can be seated and arranged for infants and toddlers of different ages. The child car seat is designed for safety of children, it can restrain dangerous behavior of a child in the car during travelling, and protect the child from injury in event of a sudden collision of the car and other unexpected events.

The child car seat can be designed to be detachable, including a base fixed on the car and a seat mounted on the base. For the fixed structure between the base and the seat, it is expected to have a performance of easy operation, safety and stability. In most clamping structures of the existing child car seat and the base, an elastic member structure is arranged on a clamping hook of the base to bias it to a locked position or an unlocked position. Such structure may result in accidental release of the clamping hook in the event of slight collisions and bumps on the on the seat, causing the seat to separate from the base.

SUMMARY

According to this application, a clamping hook structure for assembling and connecting a base to a crossbar is provided, the clamping hook structure comprises: a bracket, fixed to the base, having two opposite side walls; a clamping hook, pivotally connected to the bracket through a clamping hook pivot set up between the two side walls, so as to be pivoted between a locked position and an unlocked position, the clamping hook has a protruding first hook portion and an engaging portion located between the first hook portion and the clamping hook pivot, when the clamping hook is in the locked position or the unlocked position, the first hook portion fixes or releases the crossbar; and a first elastic member, one end of the first elastic member is fixed to the bracket, and the other end of the first elastic member is fixed to the engaging portion, thus being able to be displaced between the locked position and the unlocked position as the clamping hook is pivoted.

According to the application, a seating device is provided, the seating device includes: a base, fixed to a car; a seating portion, detachably fixed to the base; a rear crossbar, disposed on one of the base and the seating portion; a rear clamping hook structure, respectively disposed on the other of the base and the seating portion, and capable of engaging with the rear crossbar; wherein the rear clamping hook structure is the clamping hook structure according to the application, and the crossbar is the rear crossbar.

BRIEF DESCRIPTION OF THE DRAWINGS

Embodiments of the present application will be specifically described below in conjunction with the accompanying drawings, in which.

DETAILED DESCRIPTION

Although the application is illustrated and described herein with reference to specific embodiments, the application should not be limited to the shown details. Specifically, various modifications may be made in these details within the scope of equivalents of the claims and without departing from the application.

The direction descriptions such as “front,” “rear,” “up,” and “down” involved in this document are only for the convenience of understanding, and the disclosure is not limited to these directions, but can be adjusted according to actual situation.

Figure 1A:
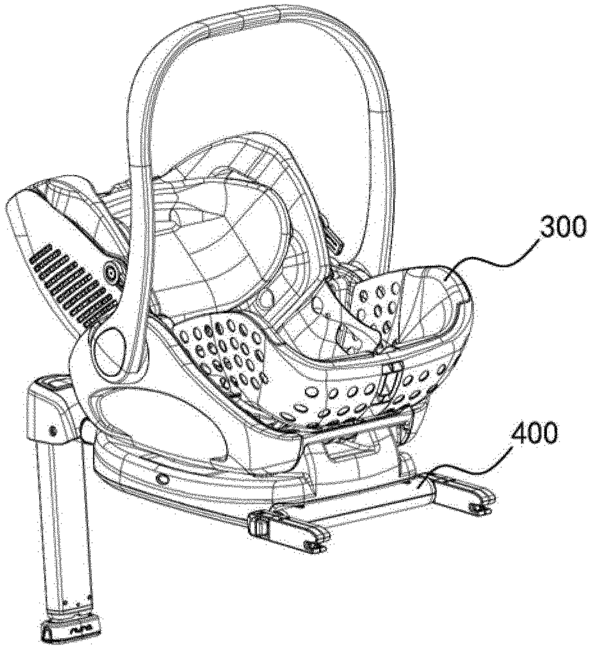
FIG. 1A is a perspective view of a seating device according to one embodiment of the application, wherein the seating portion is a seat.
Figure 1B:
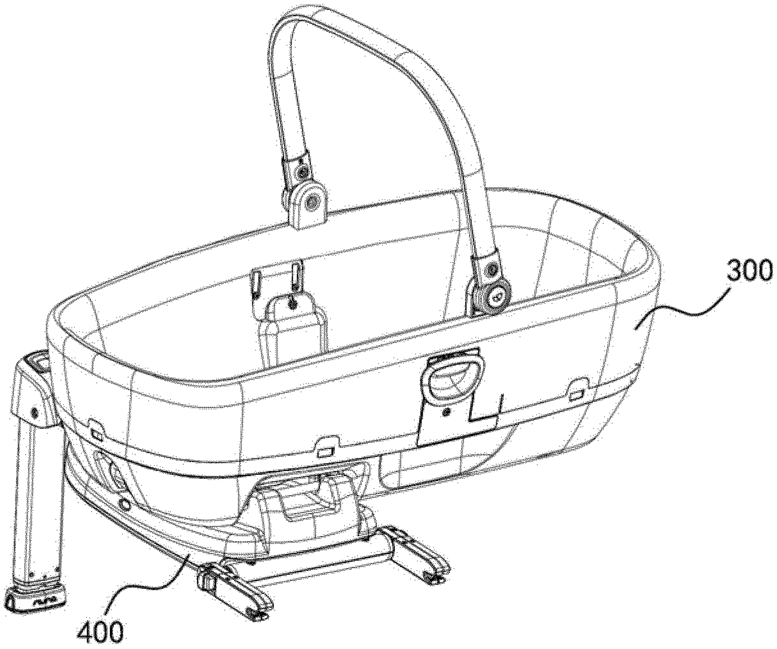
FIG. 1B is a perspective view of a seating device according to another embodiment of the application, wherein the seating portion is a carrycot.
Figure 2:
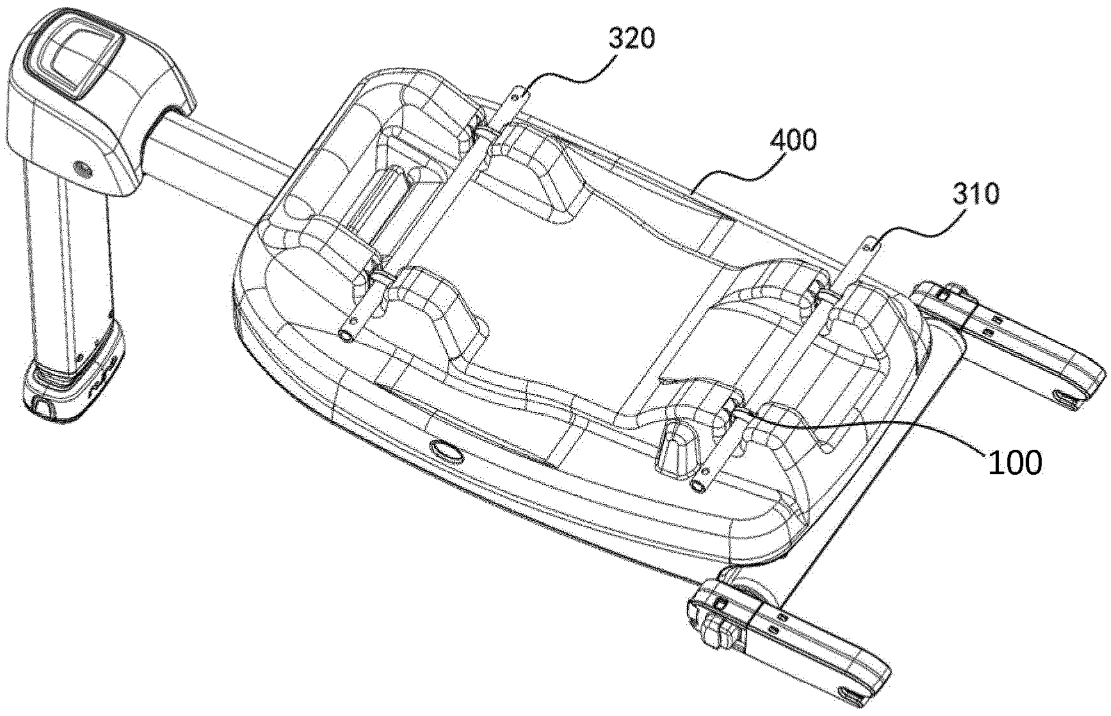
FIG. 2 is a perspective view showing a relationship among a base, a crossbar, and a clamping hook structure of the seating device.

Firstly, the seating device according to the application will be generally described by referring to FIGS. 1A-2. FIG. 1A is a perspective view of a seating device according to one embodiment of the application, wherein the seating portion 300 is a child car seat; FIG. 1B is a perspective view of a seating device according to another embodiment of the application, wherein the seating portion 300 is a carrycot; FIG. 2 is a perspective view showing a relationship among a base 400, crossbars (front crossbar 310 and rear cross bar 320), and a clamping hook structure 100 of the seating device.

As shown, the seating device may be divided into a base 400 and a seating portion 300, wherein the seating portion 300 may be a seat or a carrycot. The seating portion 300 may be arranged to be engaged on the base 400 in a longitudinal direction (advancing direction of the vehicle), such as the engagement shown in FIG. 1A. At this time, the child in the seating portion 300 faces substantially in the advancing direction of the vehicle. The seating portion 300 may also be arranged to be transversally engaged on the base 400, such as the engagement shown in FIG. 1B. At this time, the child in the seating portion 300 is lying in the carrycot with his body substantially transverse to the advancing direction of the vehicle.

The seating portion 300 may be engaged to the base 400 or detached from the base 400. Engagement between the seating portion 300 and the base 400 is achieved through the crossbars (front crossbar 310 and rear cross bar 320) and the clamping hook structure 100. In the embodiment shown in FIG. 2, the crossbars are mounted to a bottom of the seating portion 300 (the seating portion is not shown), and the clamping hook structure is mounted to the base 400. The clamping hook in the clamping hook structure 100 can hook or release the crossbars, thereby engaging the seating portion 300 to the base 400 or removing the seating portion 300 from the base 400. It should be understood, in other embodiments, the crossbars may also be mounted to the base 400, and the clamping hook structure 100 may also be mounted to the seating portion 300. In the embodiment shown in FIG. 2, the clamping hook structure 100 is provided by two respectively along extending directions of the crossbars. It should be understood, in other embodiments, the clamping hook structure 100 may also be provided as single or more than two along the extending direction(s) of the cross bar(s).

The crossbars are provided by two side by side along the advancing direction of the vehicle, and are respectively referred to as a front crossbar 320 and a rear crossbar 310. In the application, the clamping hook structure for engaging the front crossbar 320 and the rear crossbar 310 have different configurations. In the following, the term “clamping hook structure” specifically refers to the clamping hook structure 100 for engaging the rear crossbar 310 (i.e., the clamping hook structure), and for sake of distinction, the clamping hook structure for engaging the front crossbar 320 is referred to as the “front clamping hook structure 200.”

Figure 3A:
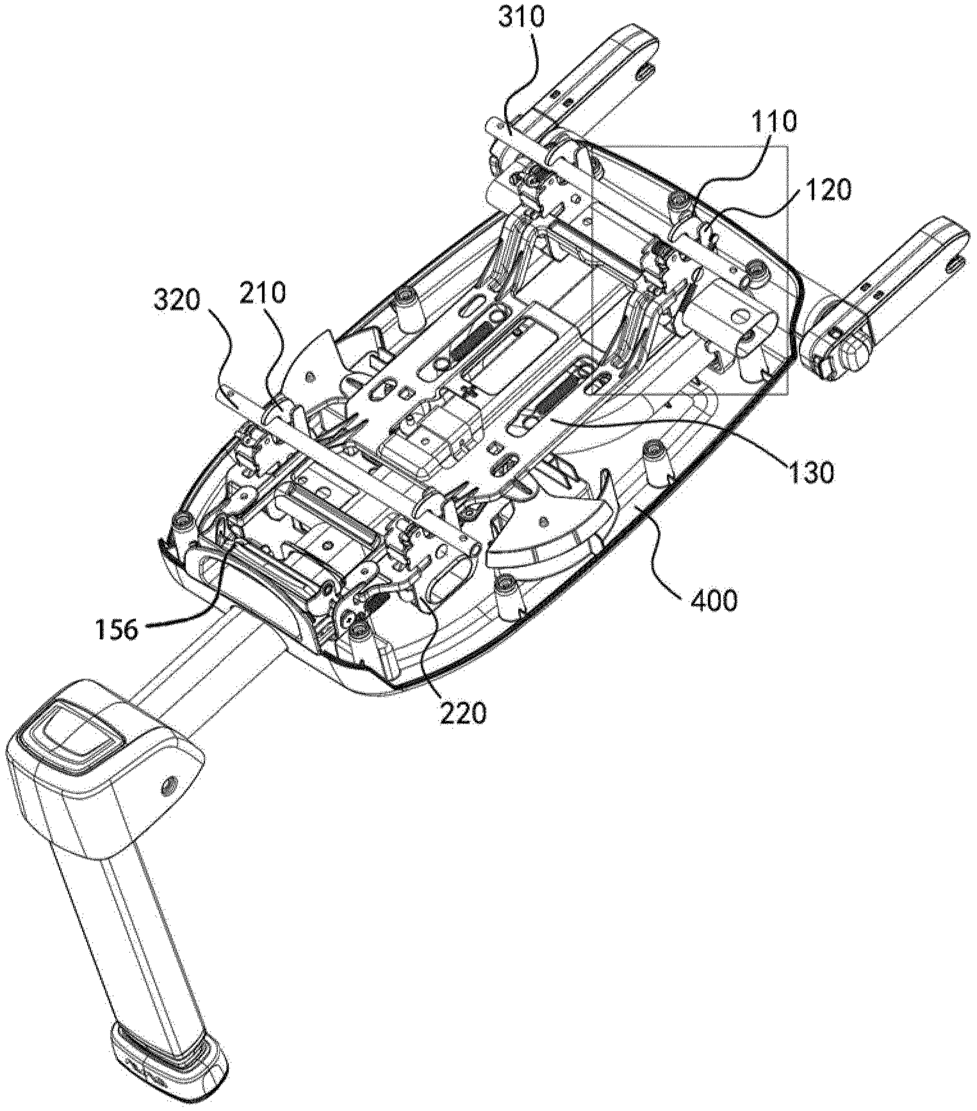
FIG. 3A is a perspective view showing a relationship among the base, the crossbar, and the clamping hook structure of the seating device, wherein an upper case is removed in order to show a specific structure inside the case.
Figure 3B:
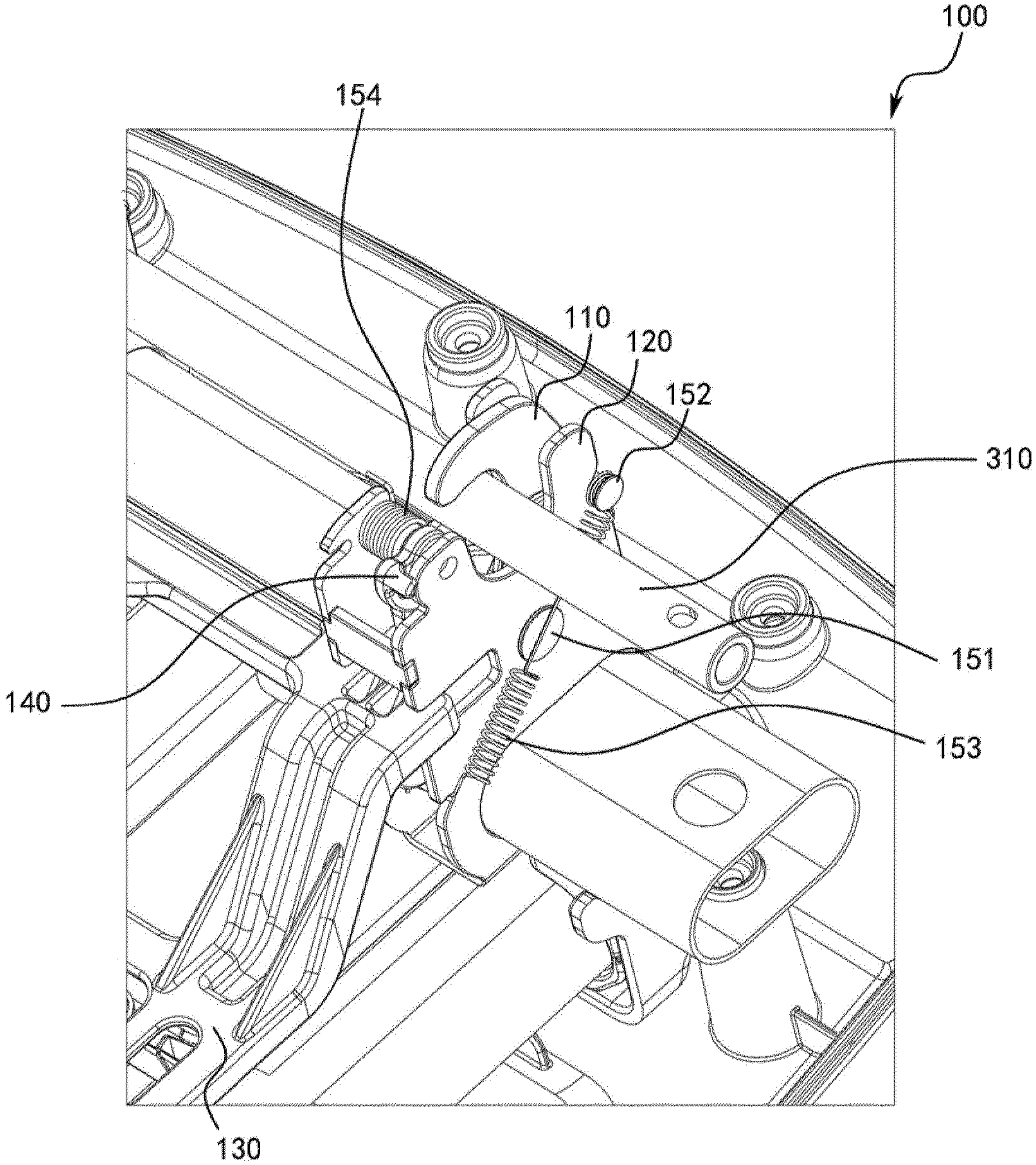
FIG. 3B is an enlarged view of a clamping hook structure in FIG. 3A.
Figure 3C:
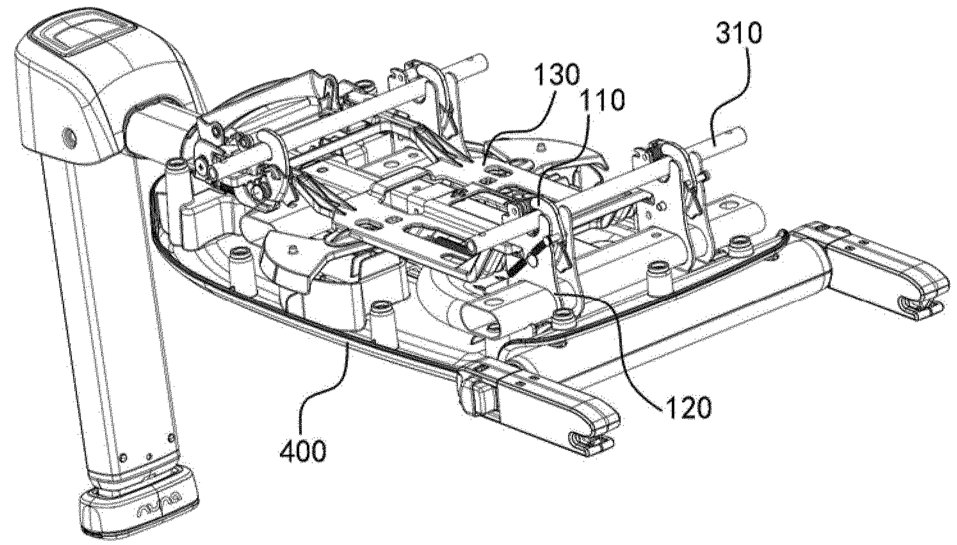
FIG. 3C is a perspective view of showing the relationship among the base, the crossbar, and the clamping hook structure of the seating device from another angle, wherein the upper case is removed in order to show the specific structure inside the case.
Figure 3D:
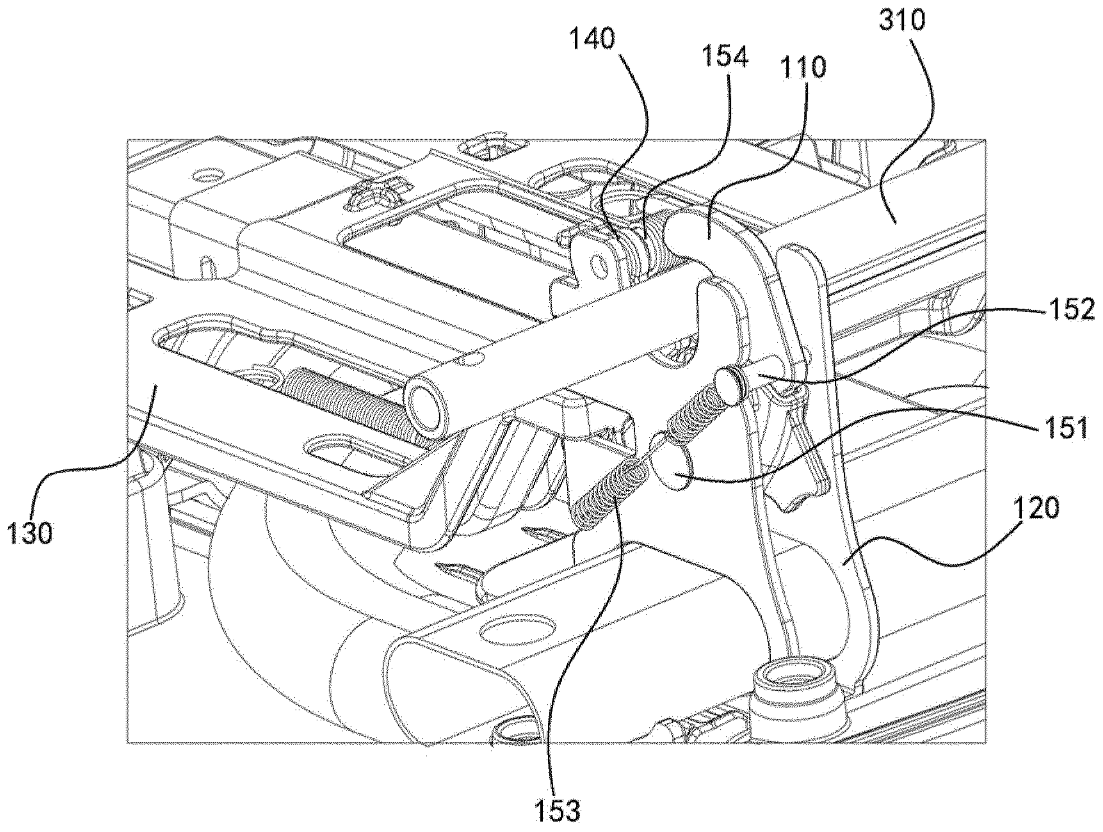
FIG. 3D is an enlarged view of the clamping hook structure in FIG. 3C.

Referring now to FIGS. 3A-3D, wherein the specific structure of the clamping hook structure 100 and its engagement with the rear crossbar 310 are shown. FIG. 3A is a perspective view showing a relationship among the base 400, the rear crossbar 310, and the clamping hook structure 100 of the seating device, wherein an upper case is removed in order to show the specific structure inside the case; FIG. 3B is an enlarged view of the clamping hook structure 100 in FIG. 3A; FIG. 3C is a perspective view of showing the relationship among the base 400, the rear crossbar 310, and the clamping hook structure 100 of the seating device from another angle, wherein the upper case is removed in order to show the specific structure inside the case; FIG. 3D is an enlarged view of the clamping hook structure 100 in FIG. 3C.

As shown, the clamping hook structure 100 includes a bracket 120, a clamping hook 110, a clamping member 140, and a sliding member 130, and further includes a clamping hook pivot 151, a pin 152, a first elastic member 153, and a second elastic member 154. The bracket 120 is fixed to the base 400, so as to mount other components of the clamping hook structure 100. The clamping hook 110 is pivotally mounted to the bracket 120, so as to provide a locking function of the clamping hook structure 100. The clamping member 140 is also pivotally mounted to the bracket 120, and its function is to clamp the clamping hook 110 to the unlocked position. The clamping hook pivot 151 is arranged on the bracket 120, so as to provide a pivoting function of the clamping hook 110. The pin 152 is inserted on the clamping hook 110 along an extending direction of the rear crossbar 310. The first elastic member 153 is arranged between the bracket 120 and the clamping hook 110 for biasing the clamping hook 110 to the locked position or unlocked position. The second elastic member 154 is arranged between the bracket 120 and the clamping member 140 for biasing the clamping member 140 to a clamped position. These components will be described in detail below.

Figure 4:
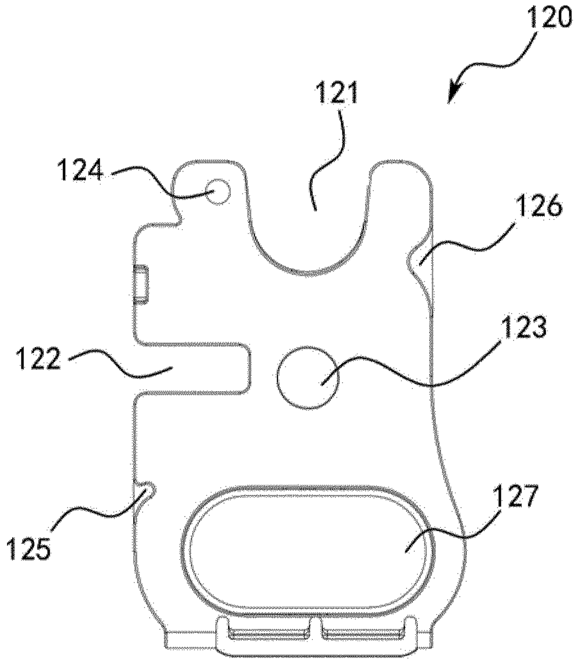
FIG. 4 is a side view of a bracket in the clamping hook structure.

FIG. 4 is a side view of the bracket 120 in the clamping hook structure 100. The bracket 120 has two side walls of substantially the same shape and opposite to each other. In the shown embodiment, the sidewalls are generally rectangular, however it should be understood, in other embodiments, the side walls may have different bonding profiles.

There is an arc-shaped groove 121 at upper edges of the side walls for receiving the crossbars. When the crossbars are located in the groove 121 of the side walls and the clamping hook 110 hooks the crossbars, the crossbars are stably engaged to the clamping hook structure 100. The side walls are provided with a clamping hook pivot mounting hole 123 and a clamping member pivot mounting hole 124, such that the clamping hook pivot 151 and a clamping member pivot (not shown) may be mounted between the two side walls. A lower part of each of the side walls has a bracket fixing portion 127, which is an elongated through hole in this embodiment. One side of each of the side walls (e.g., the left side of the side wall in FIG. 4) is provided with a first elastic member fixing portion 125, which is arranged as a depression on the edge of the side wall, and an end of the first elastic member 153 is fixed in the depression. That is, the first elastic member 153 is fixed to at least one of the side walls of the bracket 120. The one side of each of the side walls (e.g., the left side of the side wall in FIG. 4) is further provided with a sliding member accommodating portion 122, which is provided as a rectangular opening, and an end of the sliding member 130 may be inserted into the sliding member accommodating portion 122, so as to position and limit the sliding member 130. The other side of each of the side walls (e.g., the right side of the side wall in FIG. 4) is provided with a pin avoidance portion 126, such that moving of the pin 152 with pivoting of the clamping hook 110 is not interfered by the side walls of the bracket 120.

Figure 5:
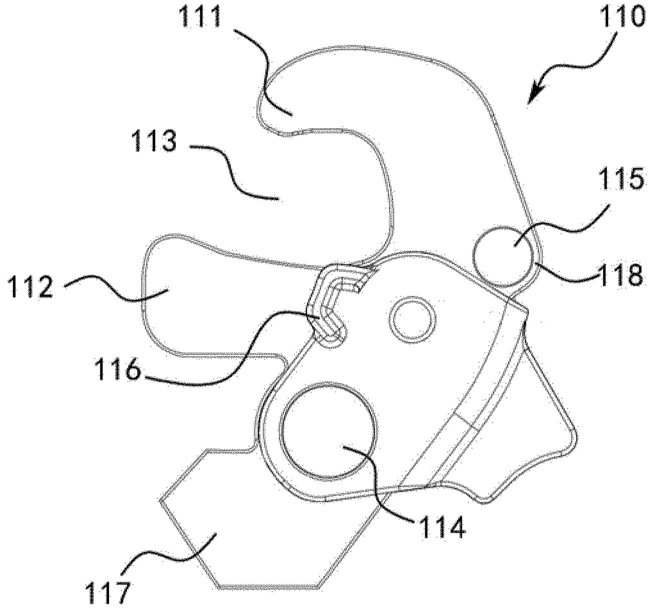
FIG. 5 is a side view of a clamping hook in the clamping hook structure.

FIG. 5 is a side view of the clamping hook 110 in the clamping hook structure 100. In this embodiment, one end of the clamping hook 110 is a protruding first hook portion 111, and the other end is a protruding foot portion 117. A middle of the clamping hook 110 is provided with a clamping hook pivoting hole, such that the clamping hook pivot 151 may be inserted therein. An engaging portion (i.e., elastic member engaging portion) 118 is disposed between the first hook portion 111 and the clamping hook pivot hole 114, and the other end of the first elastic member 153 is fixed to the engaging portion 118. The clamping hook 110 further has a second hook portion 112. The second hook portion 112 is located between the clamping hook pivot 151 and the first hook portion 111, and has the same axial position in respect to the clamping hook pivot 151 as the first hook portion 111, and protrudes forward longer than the first hook portion 111 and forms with the first hook portion 111 a generally C-shaped accommodating portion (crossbar accommodating portion) 113 for accommodating the crossbar. A clamping hook abutting portion 116 is formed in the middle of the clamping hook 110, and the clamping hook abutting portion 116 extends in the thickness direction of the clamping hook 110 (i.e., axial direction of the clamping hook pivot 151), thus the clamping hook abutting portion 116 is in a different axial portion from that of the first hook portion 111, the second hook portion 112, the foot portion 117, and the engaging portion 118. The clamping hook abutting portion 116 is formed with an abutting surface facing forward. In this embodiment, a pin hole 115 is formed in the engaging portion 118. The first elastic member 153 is fixed to the clamping hook 110 by inserting the pin 152 into the pin hole 115 and fixing the other end of the first elastic member 153 (i.e., the end opposite to the end fixed to the first elastic member fixing portion 125 of the bracket 120) to the pin 152. While in other embodiments, the other end of the first elastic member 153 may also be fixed to the engaging portion 118 by other means.

Figure 6:
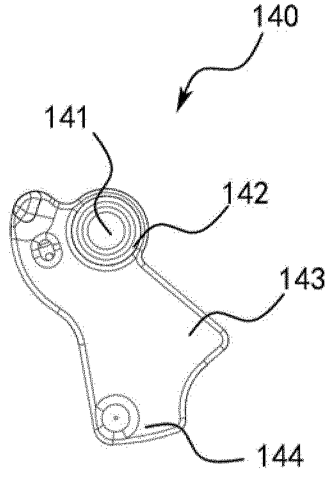
FIG. 6 is a side view of a clamping member in the clamping hook structure.

FIG. 6 is a side view of the clamping member 140 in the clamping hook structure 100. The clamping member 140 has a pivot end 142 and a free end 143, wherein the pivot end 142 is pivotally connected to the bracket 120 through the clamping member pivot (not shown) in a clamping member pivot hole 141, and the pivot of the clamping member is parallel to the clamping hook pivot 151. The free end 143 of the clamping member 140 can be rotated around the pivot end 142. The free end 143 is provided with a clamping member abutting portion 144, which is formed as an abutting surface on a side of the clamping member 140. When the clamping member 140 is pivoted to its clamped position (will be described in detail below), the abutting surface at the clamping member abutting portion 144 of the clamping member 140 abuts against the abutting surface at the clamping hook abutting portion 116 of the clamping hook 110, thereby clamping the clamping hook 110 to the unlocked position.

The first elastic member 153 is arranged to always apply a pulling force to the clamping hook 110. In this embodiment, the first elastic member 153 is a tension spring, moreover, it should be understood, in other embodiments, the first elastic member 153 may be other elastic members capable of exerting tensile force.

The second elastic member 154 is arranged to bias the clamping member 140 to the clamped position. In this embodiment, the second elastic member 154 is a torsion spring disposed on the clamping member pivot, with one end abutting against the bracket 120 and the other end abutting against the clamping member 140. In other embodiments, the second elastic member 154 may also be an elastic member of other forms.

The sliding member 130 is arranged to slide along the base 400. One end of the sliding member 130 extends out of the dragging portion 131, and the other end of the sliding member 130 is connected to an operating member 156. The dragging portion 131 protrudes between the two side walls of the bracket 120, and the operating member 156 is formed as a handle transverse to the sliding member 130. The user can contact the operating member 156 from the outside of the base 400 in order to pull the sliding member 130. The dragging portion 131 is coupled to the foot portion 117 of the clamping hook 110 through a sliding slot or the like, such that when the sliding member 130 moves forward, it can bring the clamping hook 110 to rotate to the unlocked position.

Figure 7A:
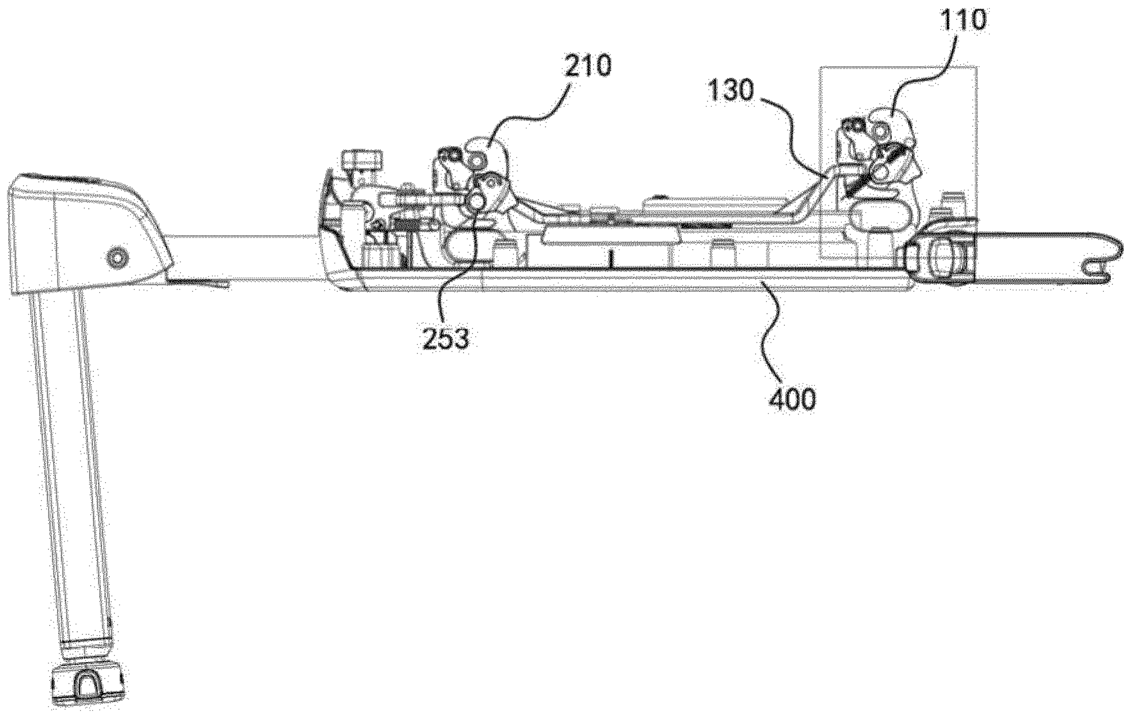
FIG. 7A is a side view showing the clamping hook structure in a locked state.
Figure 7B:
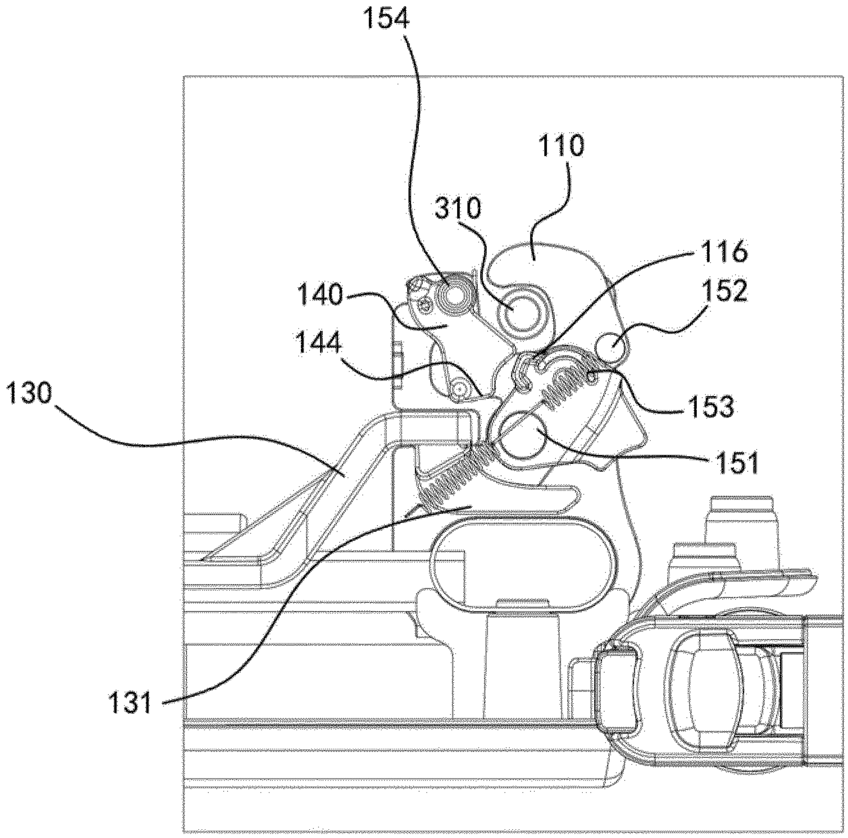
FIG. 7B is an enlarged view of the clamping hook structure in FIG. 7A, wherein a first elastic member is located on one side of a pivoting axis of the clamping hook.
Figure 8A:
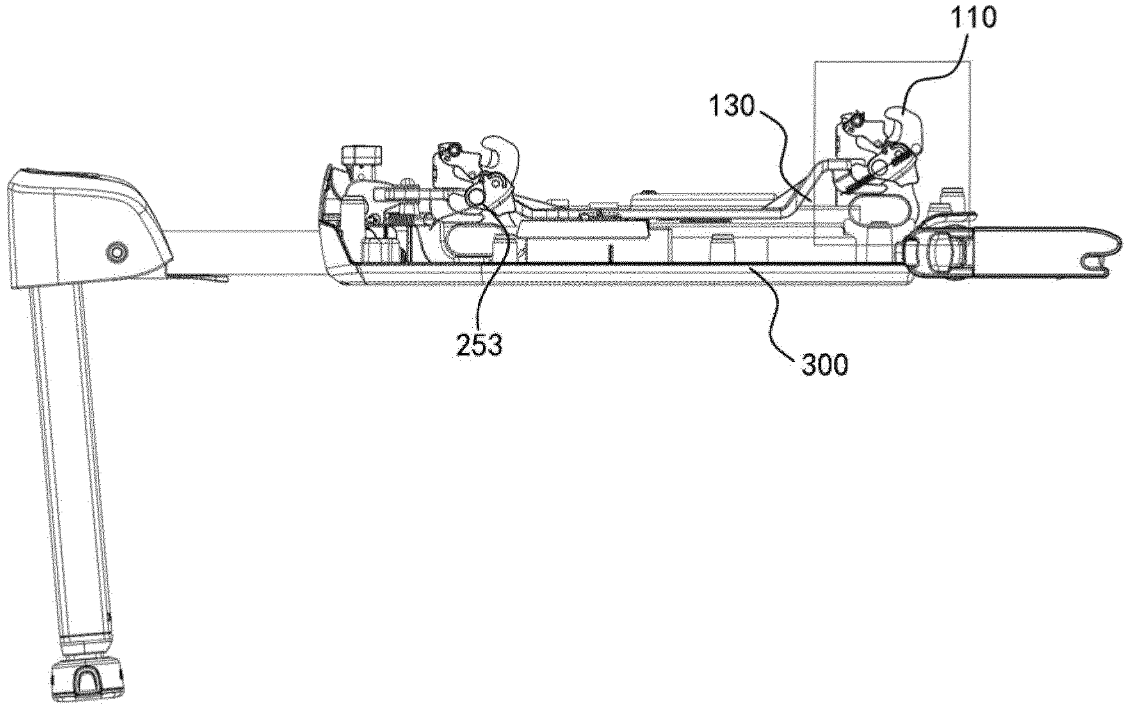
FIG. 8A is a side view showing the clamping hook structure in an unlocked state.

The operation of the clamping hook 110 according to the application will be described below by referring to FIGS. 7A-8B. FIG. 7A is a side view of the clamping hook structure 100 in a locked state; FIG. 7B is an enlarged view of the clamping hook structure 100 in FIG. 7A, wherein the first elastic member 153 is located on one side of the pivoting axis of the clamping hook 110; FIG. 8A is a side view of the clamping hook structure 100 in an unlocked state; and FIG. 8B is an enlarged view of the clamping hook structure 100 in FIG. 8A, wherein the first elastic member 153 is located on the other side of the pivoting axis of the clamping hook 110.

In the locked state shown in FIG. 7A-7B, the clamping hook 110 is in the locked position, and hooks the rear crossbar 310 to lock the rear crossbar 310 between the clamping hook 110 and the bracket 120. Since the first elastic member 153 is connected between the first elastic member fixing portion 125 of the bracket 120 and the engaging portion 118 of the clamping hook 110, as the clamping hook 110 rotates around its pivoting axis, the first elastic member 153 also changes its position accordingly, such that it can be located on either sides of the pivoting axis. When pivoted to close or reach the locked position, the first elastic member 153 is located on the side of the pivoting axis close to crossbar. In this way, the force exerted by the first elastic member 153 pulling the clamping hook 110 toward the bracket 120 will drive the clamping hook 110 to rotate to its locked position, that is, an automatic locking is achieved. As shown, the pivoting axis of the clamping hook 110 is the axis of the clamping hook pivot 151.

At this time, the clamping member 140 is in its non-clamped position, and the clamping member abutting portion 144 is not in contact with the clamping hook abutting portion 116. Although the second elastic member 154 located between the clamping member 140 and the bracket 120 tends to bias the clamping member 140 to the clamped position, the crossbar presses on the free end 143 of the clamping member 140 at this time, preventing the clamping member 140 from rotating to the clamped position.

Figure 8B:
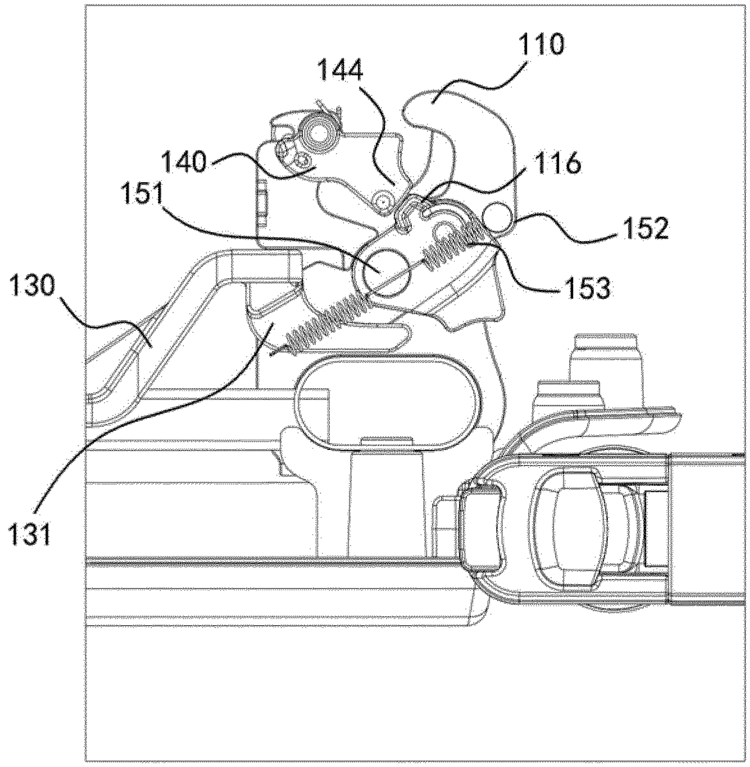
FIG. 8B is an enlarged view of the clamping hook structure in FIG. 8A, wherein the first elastic member is located on the other side of the pivoting axis of the clamping hook.

In order to make the clamping hook structure 100 reach the unlocked position shown in FIGS. 8A-8B, the user may pull the sliding member 130 forward, specifically, pulling the operating member 156 connected to the sliding member 130, such that the sliding member 130 brings the clamping hook 110 to rotate to the unlocked position. During this process, the position of the first elastic member 153 changes accordingly, moving from the side of the pivoting axis of the clamping hook 110 close to the crossbar to the side away from the crossbar by across the pivoting axis, i.e., passing a “dead point” of the clamping hook 110. After passing the dead point, the biasing force of the first elastic member 153 pulling the clamping hook 110 toward the bracket 120 will drive the clamping hook 110 to rotate to its unlocked position, that is, the automatic unlocking is realized.

After the clamping hook 110 reaches its unlocked position, the crossbar is no longer locked in the clamping hook structure 100, and the user can then remove the seating device from the base 400, and thus also remove the crossbar. In this way, the clamping member 140 is no longer subjected to the pressure of the crossbar, and will rotate to its clamped position under biasing of the second elastic member 154. At this time, the clamping member abutting portion 144 of the clamping member 140 contacts the clamping hook abutting portion 116 of the clamping hook 110, preventing the clamping hook 110 from returning to the locked position, thus preventing the clamping hook 110 from being accidentally locked. It should be noted, at this time, the second hook portion 112 of the clamping hook 110 and the free end 143 of the clamping member 140 both are at least partially located in the groove 121 of the bracket 120.

In order to make the clamping hook structure 100 return from the unlocked position shown in FIGS. 8A-8B to the locked position shown in FIGS. 7A-7B, the user may mount the seating device to the base 400, that is, to press the crossbar into the groove 121 of the bracket 120. At this time, the crossbar presses the second hook portion 112 of the clamping hook 110 and the free end 143 of the clamping member 140 down, forcing the clamping hook 110 to return to the locked position and the clamping member 140 to return to the non-clamped position.

Figure 12:
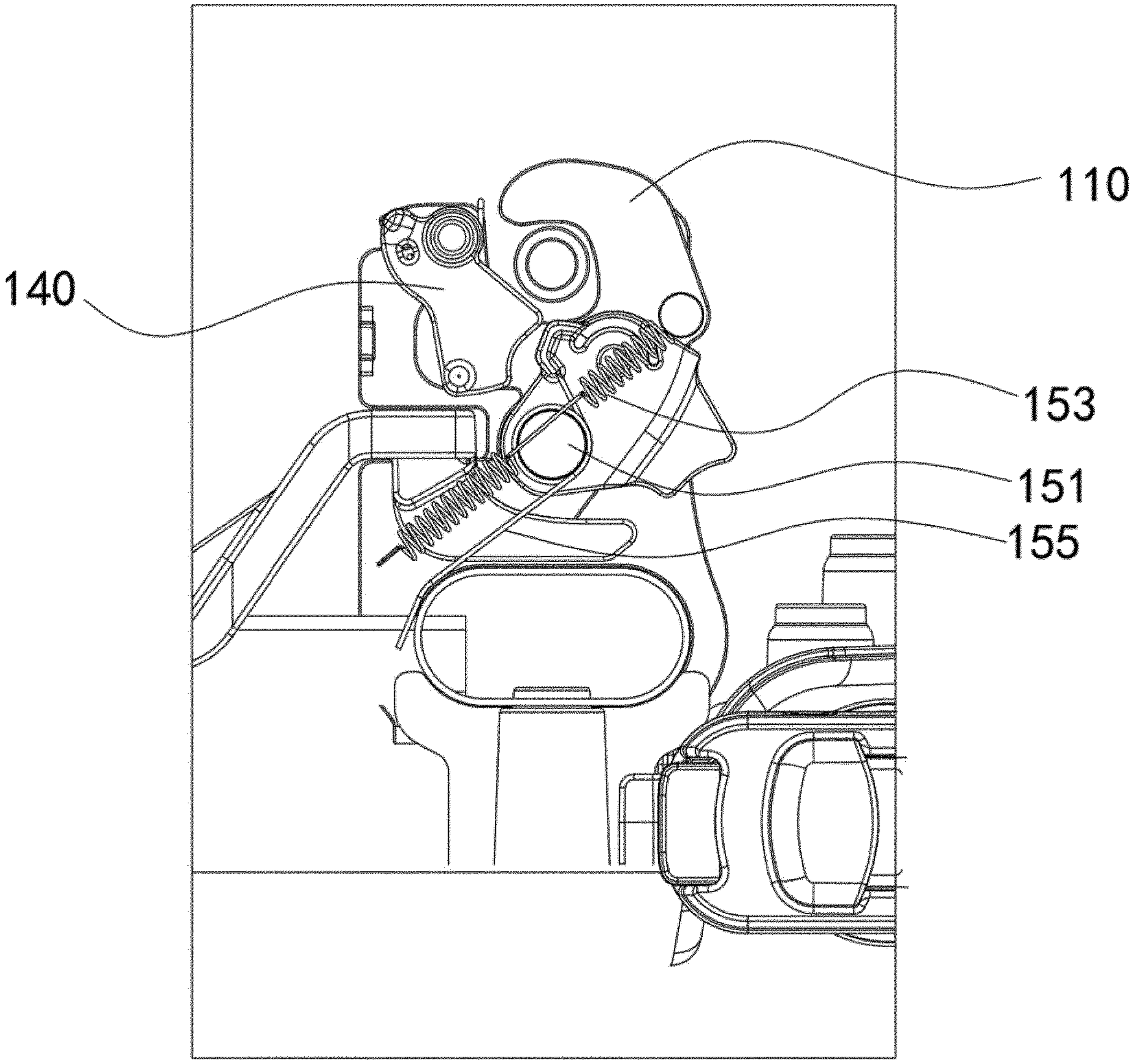
FIG. 12 is an enlarged partial view of the clamping hook structure according to another embodiment of the application, wherein a third elastic member arranged on a clamping hook pivot is shown.

In an embodiment, the clamping hook pivot 151 may be further provided with a third elastic member 155, and the third elastic member 155 may be in the form of, for example, a torsion spring biasing the clamping hook 110 to the unlocked position. Referring to FIG. 12, the third elastic member 155 arranged on the clamping hook pivot 151 is shown.

Figure 9A:
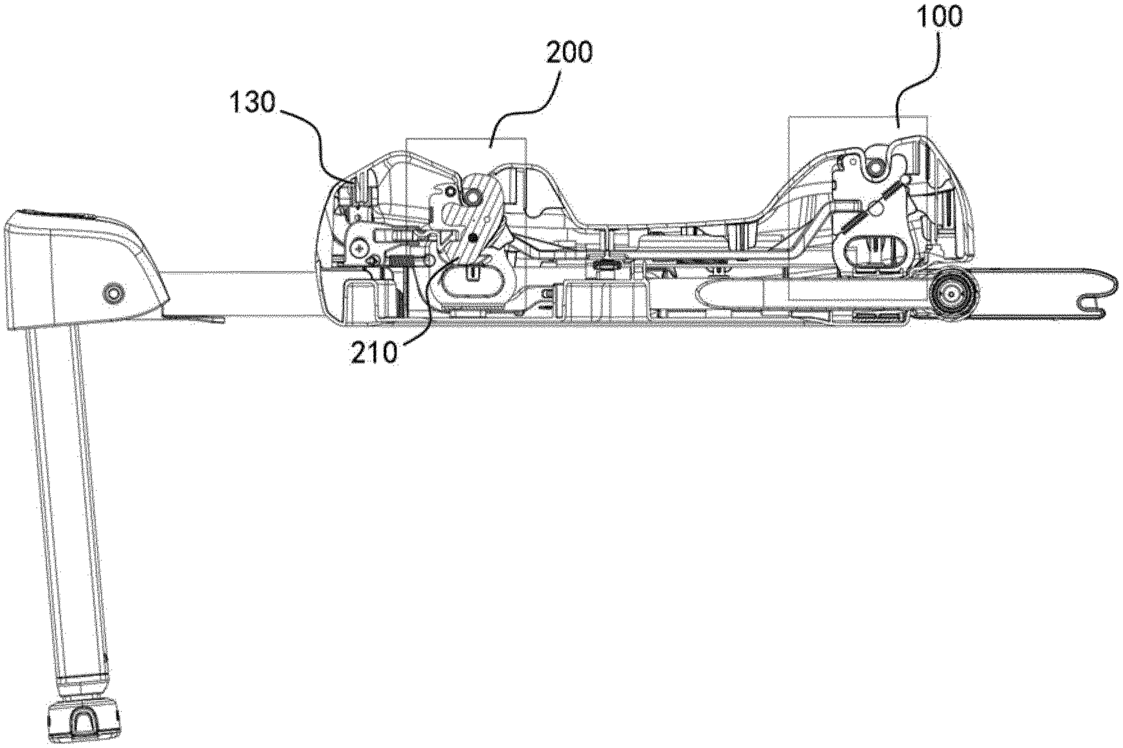
FIG. 9A is a side view of the clamping hook structure and a front clamping hook structure according to the application in a locked state, wherein the front clamping hook structure is shown in a cross-sectional view.
Figure 9B:
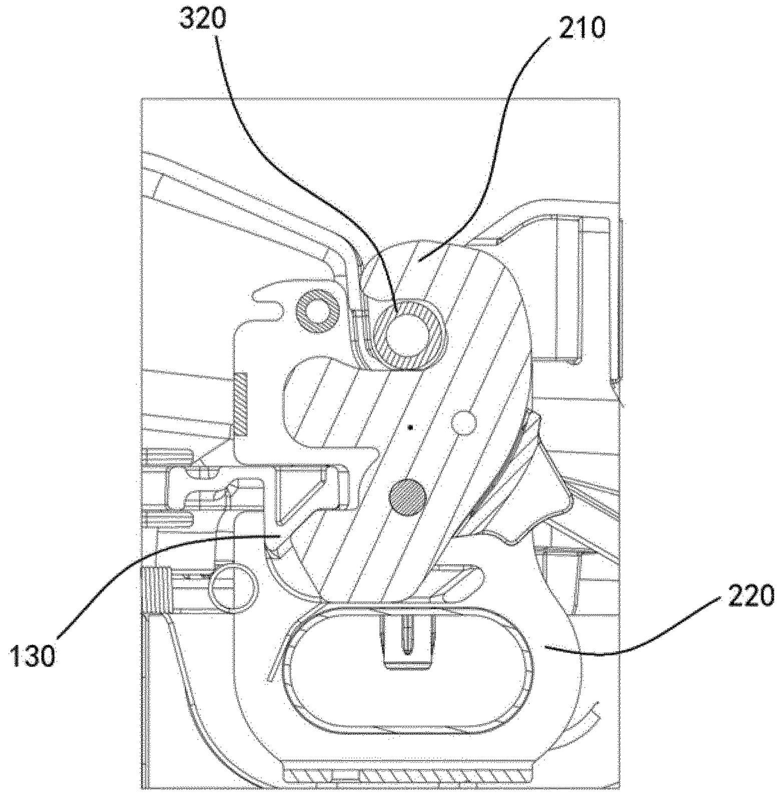
FIG. 9B is an enlarged view of the front clamping hook structure in FIG. 9A.

The front clamping hook structure 200 of the application will now be described by referring to FIGS. 9A-9B. FIG. 9A is a side view of the clamping hook structure 100 and the front clamping hook structure 200 according to the application in the locked state, wherein the front clamping hook structure 200 is shown in a cross-sectional view; and FIG. 9B is an enlarged view of the front clamping hook structure 200 in FIG. 9A. The front clamping hook structure 200 is substantially as same as the clamping hook structure 100, so only the differences between them will be described below.

The front clamping hook structure 200 has a front clamping hook 210 and a front bracket 220, as well as a fourth elastic member 253 disposed between the front clamping hook 210 and the front bracket 220 (see FIGS. 7A and 8A). Unlike the first elastic member 153 disposed between the clamping hook 110 and the bracket 120, which can bias the clamping hook 110 to the locked position or the unlocked position as the clamping hook 110 rotates, the fourth elastic member 253 always biases the front clamping hook 210 to the unlocked position. In this embodiment, the fourth elastic member 253 is a torsion spring disposed on a pivoting shaft of the front clamping hook 210. In other embodiments, the fourth elastic member 253 may also be provided as an elastic member in other form.

The operation of the seating device according to the application will be described below by referring to FIGS. 10A-FIG. 11D.

Figure 10A:
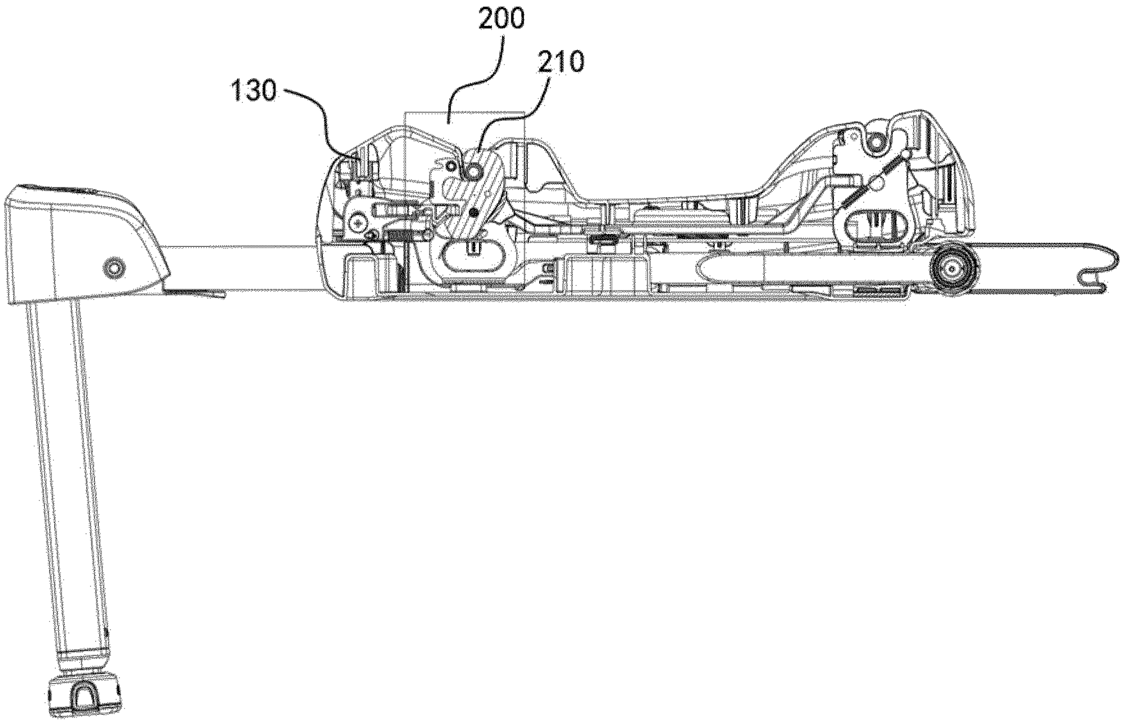
FIG. 10A is a side view of the clamping hook structure and the front clamping hook structure according to the application in a state where a sliding member is displaced by a slight collision, wherein the front clamping hook structure is shown in a cross-sectional view.
Figure 10B:
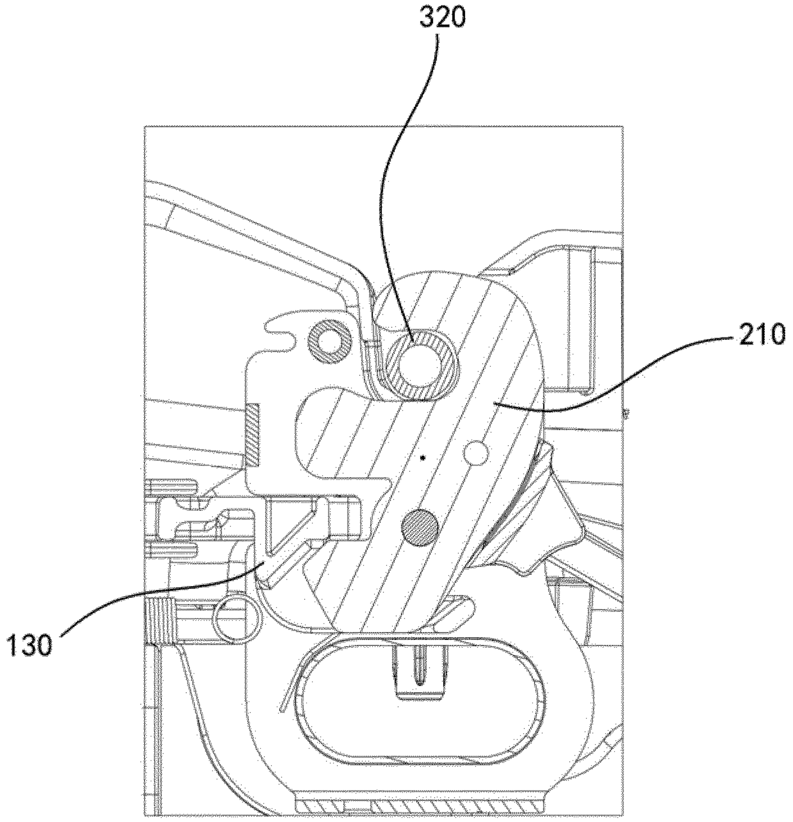
FIG. 10B is an enlarged view of the front clamping hook structure in FIG. 10A.
Figure 10C:
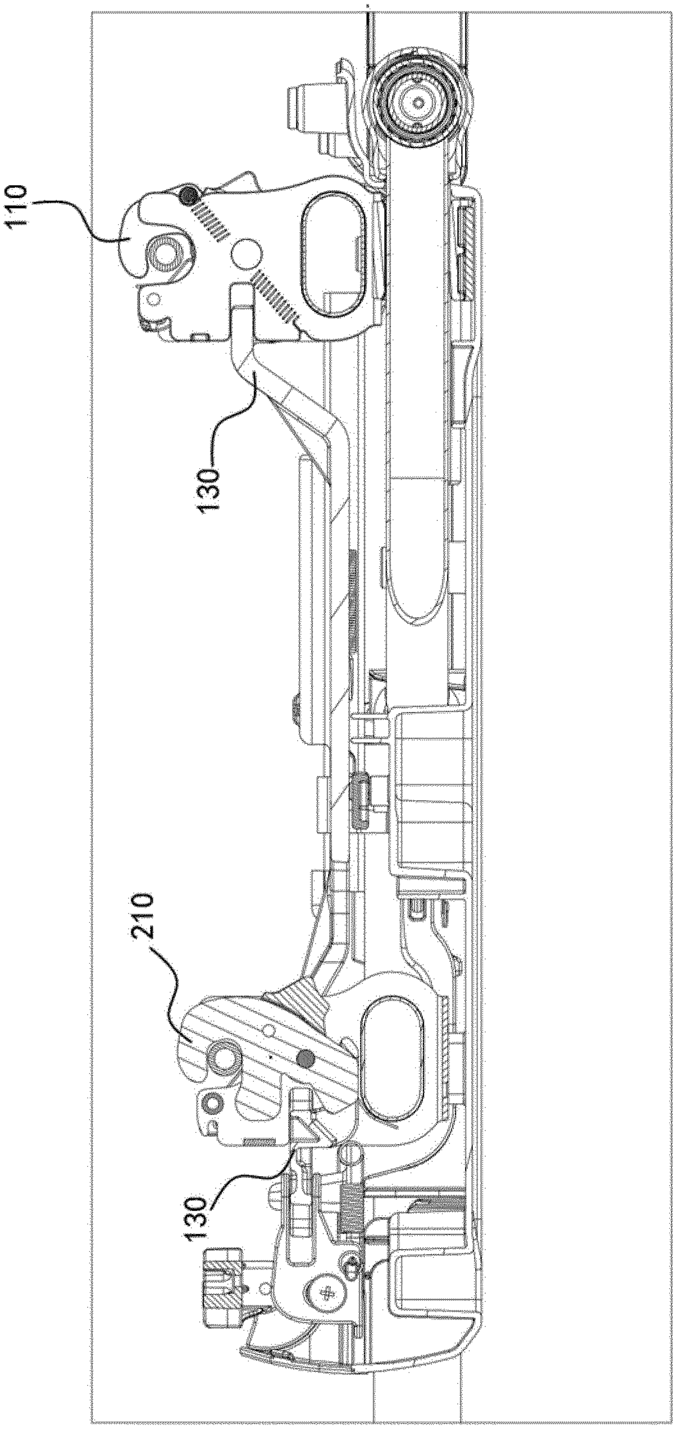
FIG. 10C is an enlarged partial view of FIG. 10A, wherein a portion of the base is removed in order to more clearly show the remaining components.
Figure 10D:
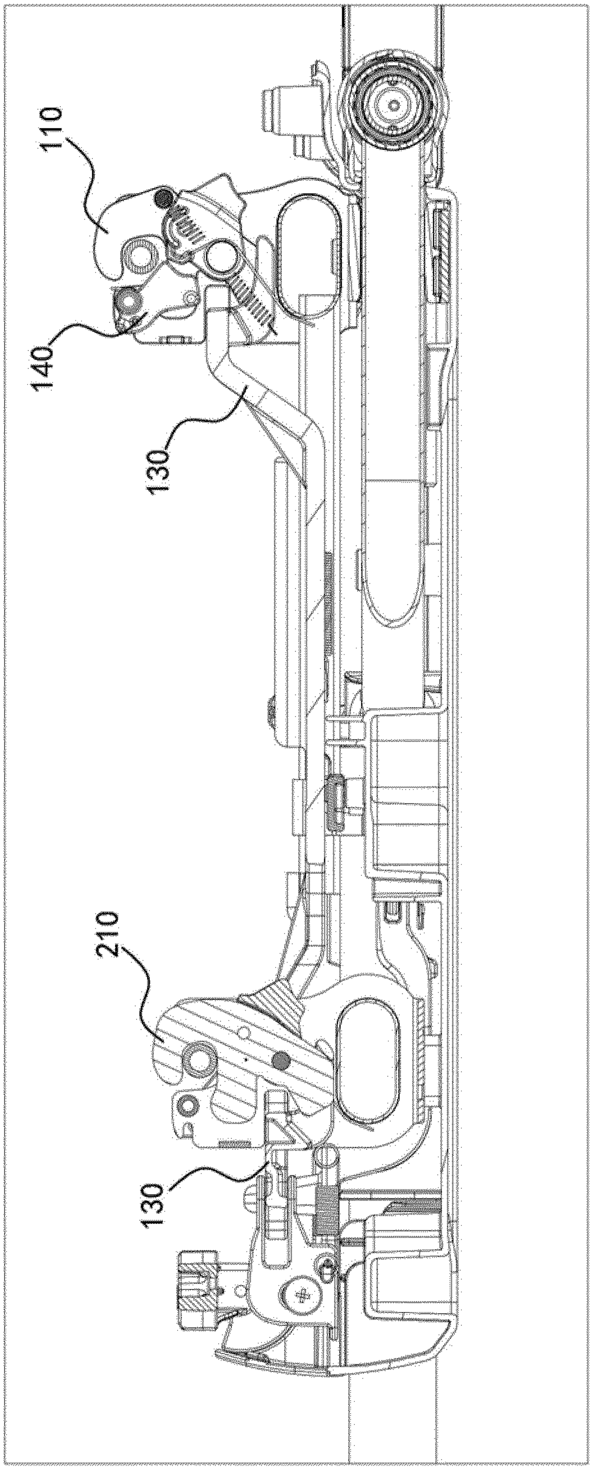
FIG. 10D is an enlarged partial view of FIG. 10A, wherein a portion of the base and a side wall of the bracket are removed in order to more clearly show the remaining components.

FIG. 10A is a side view of the clamping hook structure 100 and the front clamping hook structure 200 according to the application in a state where the sliding member 130 is displaced by a slight collision, wherein the front clamping hook structure 200 is shown in a cross-sectional view; FIG. 10B is an enlarged view of the front clamping hook structure 200 in FIG. 10A; FIG. 10C is an enlarged partial view of FIG. 10A, wherein a portion of the base 400 is removed in order to more clearly show the remaining components; and FIG. 10D is an enlarged partial view of FIG. 10C, wherein a portion of the base 400 and a side wall of the bracket 120 are removed in order to more clearly show the remaining components.

When subjected to an impact force, the seating portion 300 may tend to move forward, specifically, if the seating portion 300 is a seat, it will fall forward, and if the seating portion 300 is a carrycot it will turn forward. Therefore, the front clamping hook will be subjected to a downward pressure, while the rear clamping hook will not be subjected to pressure.

When subjected to an impact force, the sliding member 130 will slide forward, however, since the front clamping hook 210 is pressed by the crossbar, the front clamping hook 210 will not rotate to its unlocked position, and meanwhile, the sliding member 130 will be prevented from being completely disengaged from clamping with the front clamping hook 210. At the same time, since the first elastic member 153 in the rear clamping hook structure 100 tends to bias the clamping hook 110 to the locked position, the rear clamping hook is always in the locked state, so as to prevent the rear crossbar 310 from being separated.

In this way, even if the seating device is subjected to a certain collision, the seating portion 300 will not be separated from the base 400, thereby ensuring safety of the child in the seating portion 300.

Figure 11A:
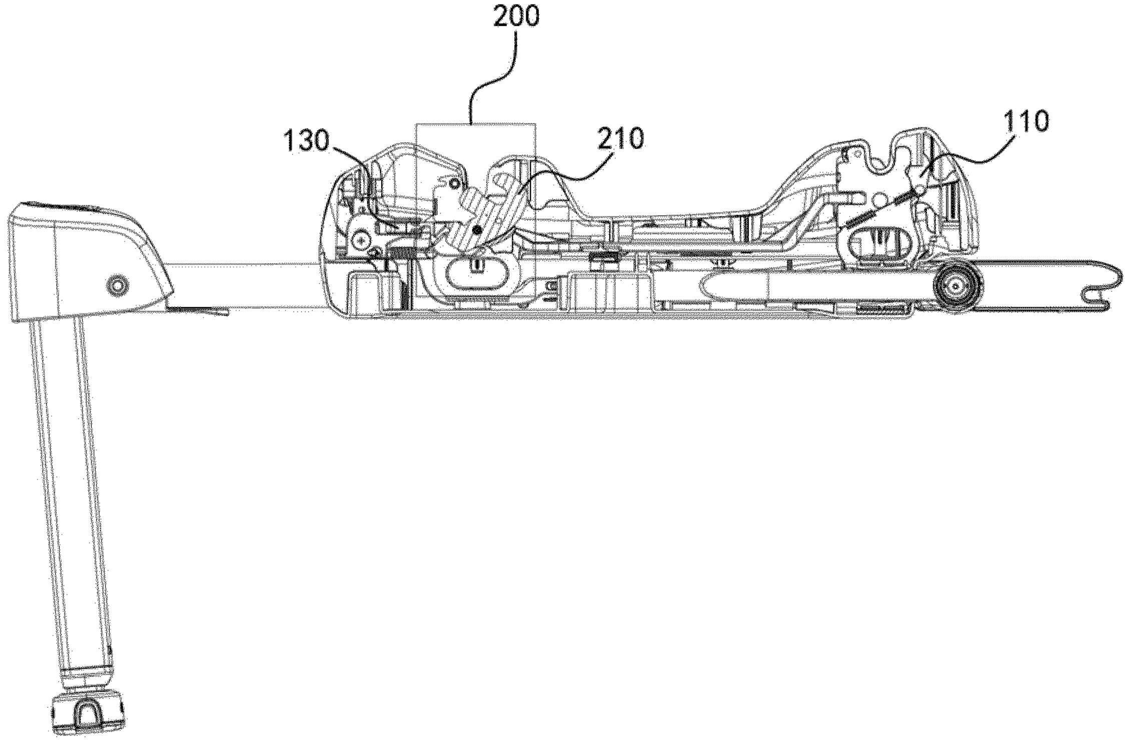
FIG. 11A is a side view of the clamping hook structure and the front clamping hook structure according to the application in an unlocked state, wherein the front clamping hook structure is shown in a cross-sectional view.
Figure 11B:
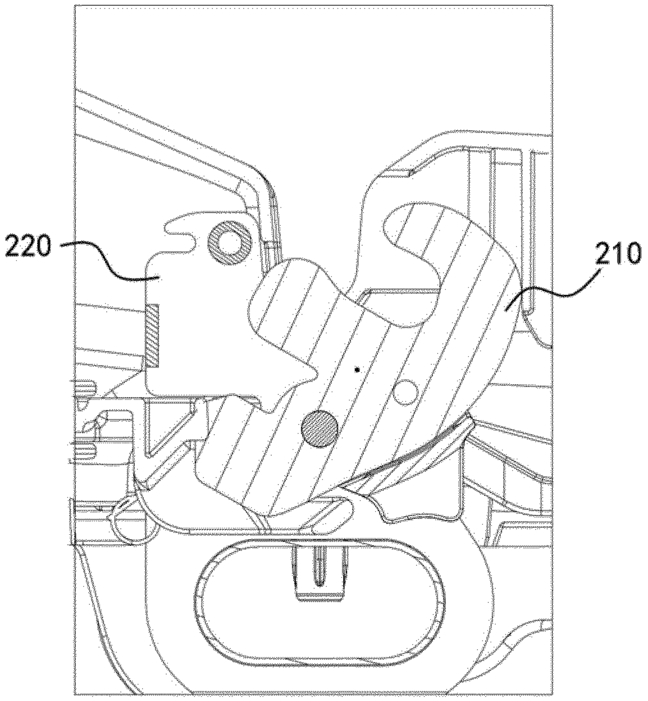
FIG. 11B is an enlarged view of the front clamping hook structure in FIG. 11A.
Figure 11C:
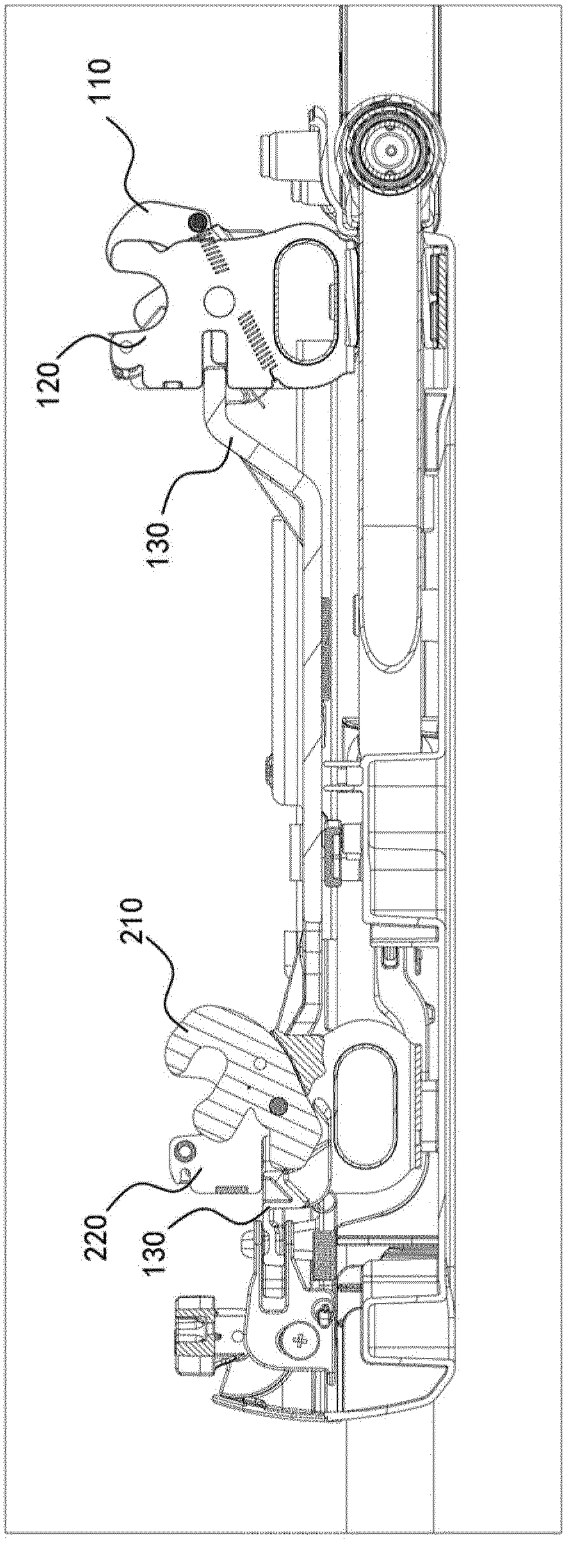
FIG. 11C is an enlarged partial view of FIG. 11A, wherein a portion of the base is removed in order to more clearly show the remaining components.
Figure 11D:
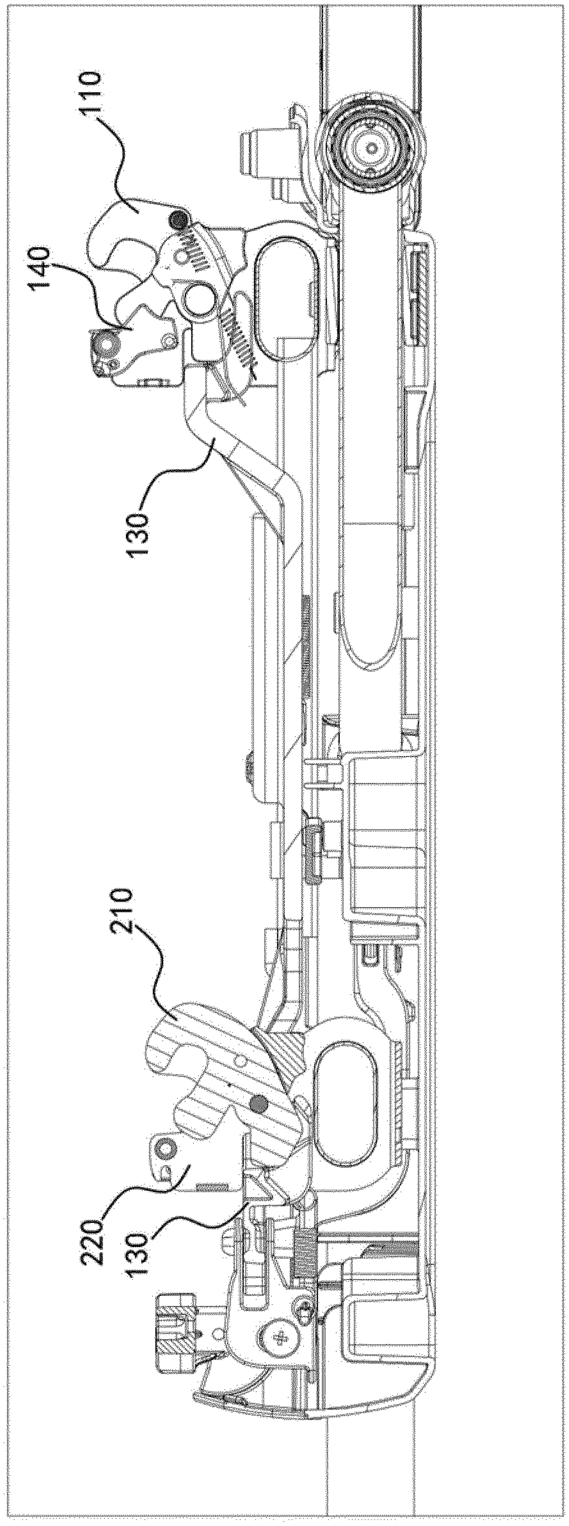
FIG. 11D is an enlarged partial view of FIG. 11A, wherein a portion of the base and a side wall of the bracket are removed in order to more clearly show the remaining components.

FIG. 11A is a side view of the clamping hook structure 100 and the front clamping hook structure 200 according to the application in unlocked state, wherein the front clamping hook structure 200 is shown in a cross-sectional view; FIG. 11B is an enlarged view of the front clamping hook structure 200 in FIG. 11A; FIG. 11C is an enlarged partial view of FIG. 11A, wherein a portion of the base 400 is removed in order to more clearly show the remaining components; and FIG. 11D is an enlarged partial view of FIG. 11A, wherein a portion of the base 400 and a side wall of the bracket 120 are removed in order to more clearly show the remaining components.

In the unlocked state, as described above, the first elastic member 153 in the rear clamping hook structure biases the clamping hook 110 to the unlocked position, and at the same time, the clamping member 140 clamps the clamping hook 110 to the unlocked position, so as to prevent the clamping hook 110 from being accidentally locked. Similarly, the fourth elastic member 253 in the front clamping hook structure 200 biases the front clamping hook 210 to the unlocked position, while the front clamping member 140 (not shown) clamps the front clamping hook 210 to unlocked position, so as to prevent the front clamping hook 210 from being accidentally locked. In this way, unless the user mounts the seating device to the base 400, and at the same time presses the crossbar into the clamping hook structure 100 and the front clamping hook structure 200, the clamping hook structure 100 and the front clamping hook structure 200 will not be accidentally switched to the locked state.

In an embodiment, the first elastic member 153 is a tension spring fixed to at least one of the side walls of the bracket 120.

In an embodiment, the two side walls of the bracket 120 are symmetrically arranged with each other, and a top of each side wall has a groove 121 opening upwards for accommodating the crossbar.

In an embodiment, the clamping hook structure 100 further comprises: a clamping member 140, having a pivot end 142 and a free end 143, the pivot end 142 is pivotally connected to the bracket 120 through a clamping member pivot disposed between the two side walls, enabling the clamping member 140 to be pivoted between a clamped position and a non-clamped position, wherein the clamping member pivot is parallel to the clamping hook pivot 151; and a second elastic member 154, disposed between the clamping member 140 and the bracket 120 for biasing the clamping member 140 to the clamped position; when the clamping hook 110 is in the locked position and locks the crossbar, the clamping member 140 is blocked by the crossbar and is in the non-clamped position.

In an embodiment, the clamping member 140 has a clamping member abutting portion 144 at its free end 143, and the clamping hook 110 has a clamping hook abutting portion 116 corresponding to the clamping member abutting portion 144; when the clamping hook 110 is in the unlocked position and release the crossbar, the clamping member 140 is pivoted to the clamped position under biasing of the second elastic member 154, such that the clamping member abutting portion 144 and the clamping hook abutting portion 116 abut against each other, so as to further hold the clamping hook 110 in the unlocked position.

In an embodiment, when the clamping hook 110 is in the locked position, the first hook portion 111 of the clamping hook 110 protrudes forward onto the opening of the groove 121, so as to lock the crossbar in the groove 121.

In an embodiment, when the clamping hook 110 is in the unlocked position, the first hook portion 111 of the clamping hook 110 moves away from the opening of the groove 121 by pivoting of the clamping hook 110, thereby releasing the crossbar.

In an embodiment, the clamping hook 110 further has a second hook portion 112 being located between the clamping hook pivot 151 and the first hook portion 111 and having a same axial position in respect to the clamping hook pivot 151 as the first hook portion 111, the second hook portion 112 protrudes forward longer than the first hook portion 111, and with the first hook portion 111 forms a substantially C-shaped accommodating portion 113 for receiving the crossbar, and when the crossbar is placed in the accommodating portion 113, the crossbar pivots the clamping hook 110 from the unlocked position to the locked position by pressing against the second hook portion 112.

In an embodiment, the first hook portion 111 and the second hook portion 112 of the clamping hook 110 and the clamping hook abutting portion 116 of the clamping hook 110 are located at different axial positions in respect to the clamping hook pivot 151, and the clamping member abutting portion 144 and the clamping hook abutting portion 116 are located at a same axial position in respect to the clamping hook pivot 151.

In an embodiment, the engaging portion 118 is a pin hole for inserting a pin 152, and the other end of the first elastic member 153 is fixed on the pin 152.

In an embodiment, the bracket 120 is provided with a pin avoidance portion 126, such that moving of the pin 152 with pivoting of the clamping hook 110 is not interfered by the bracket 120.

In an embodiment, the clamping hook 110 is engaged with a sliding member 130, enabling a sliding of the sliding member 130 to bring the clamping hook 110 to move from the locked position to the unlocked position; and one end of the sliding member 130 opposite to the clamping hook 110 is connected to an operating member 156, and the operating member 156 is formed as a handle transverse to the sliding member 130, so as to permit a user to pull the sliding member 130 from the outside of the base 400 through the operating member 156.

In an embodiment, a third elastic member 155 is further disposed between the bracket 120 and the clamping hook 110, the third elastic member 155 is a torsion spring and is sleeved on the clamping hook pivot 151.

In an embodiment, the seating device further comprises a front crossbar 320, disposed on one of the base 400 and the seating portion; and a front clamping hook structure 200, disposed on the other of the base 400 and the seating portion, and capable of engaging with the front crossbar 320; wherein the front clamping hook structure 200 includes: a front bracket 220, fixed to the other of the base 400 and the seating portion 300, having two opposite side walls; a front clamping hook 210, pivotally connected to the front bracket 220, so as to be pivoted between a locked position and an unlocked position, when the front clamping hook 210 is in the locked position or the unlocked position, the front clamping hook 210 hooks or releases the front crossbar 320; and a fourth elastic member 253, disposed between the front bracket 220 and the front clamping hook 210, and the fourth elastic member 253 biases the front clamping hook 210 to its unlocked position.

In an embodiment, the rear clamping hook structure and the front clamping hook structure 200 are engaged with the same sliding member 130, and sliding of the sliding member 130 is able to simultaneously bring the clamping hook 110 and the front clamping hook 210 to be pivoted from their respective locked positions to their respective unlocking positions.

In an embodiment, in an assembled state, the front clamping hook structure 200 and the rear clamping hook structure 100 are respectively provided by two or more along extending directions of the front crossbar 320 and the rear crossbar 310, so as to respectively lock the front crossbar 320 and the rear crossbar 310.

In an embodiment, the seating portion 300 is a child car seat or a carrycot.

Although the application has been described with reference to several typical embodiments, the terms used are terms of description and illustration rather than limitation. Since the application can be embodied in various forms without departing from its spirit and essence, it should be understood, the above embodiments are not limited to any details described above, but should be interpreted in the broadest sense within the scope defined by the claims, and therefore all changes that fall within the scope of the claims or their equivalents should be covered by the claims.

LIST OF REFERENCE SIGNS

- 100 clamping hook structure
  - 110 clamping hook
    - 111 first hook portion
    - 112 second hook portion
    - 113 accommodating portion
    - 114 clamping hook pivot hole
    - 115 pin hole
    - 116 clamping hook abutting portion
    - 117 foot portion
    - 118 engaging portion
  - 120 bracket
    - 121 groove
    - 122 sliding member accommodating portion
    - 123 clamping hook pivot mounting hole
    - 124 clamping member pivot mounting hole
    - 125 first elastic member fixing portion
    - 126 pin avoidance portion
    - 127 bracket fixing portion
  - 130 sliding member
    - 131 dragging portion
  - 140 clamping member
    - 141 clamping member pivot hole
    - 142 pivot end
    - 143 free end
    - 144 clamping member abutting portion
  - 151 clamping hook pivot
  - 152 pin
  - 153 first elastic member
  - 154 second elastic member
  - 155 third elastic member
  - 156 operating member
- 200 front clamping hook structure
  - 210 front clamping hook
  - 220 front bracket
  - 253 fourth elastic member
- 300 seating portion
  - 310 rear crossbar
  - 320 front crossbar
- 400 base

What is claimed is:

1. A clamping hook structure for assembling and connecting a base to a crossbar, the clamping hook structure comprising:

a bracket, fixed to the base, having two opposite side walls;

a clamping hook, pivotally connected to the bracket through a clamping hook pivot disposed between the two side walls, so as to be pivoted between a locked position and an unlocked position, the clamping hook has a first hook portion and an engaging portion located between the first hook portion and the clamping hook pivot, when the clamping hook is in the locked position or the unlocked position, the first hook portion fixes or releases the crossbar; and a first elastic member, one end of the first elastic member is fixed to the bracket, and the other end of the first elastic member is fixed to the engaging portion, thus being able to be displaced between the locked position and the unlocked position as the clamping hook is pivoted;

wherein in the locked position, the first elastic member is located at one side of the clamping hook pivot, and a force exerted by the first elastic member on the clamping hook drives rotation of the clamping hook towards the locked position, and in the unlocked position, the first elastic member is located at another side of the clamping hook pivot, and the force exerted by the first elastic member on the clamping hook drives the clamping hook towards the unlocked position.

2. The clamping hook structure according to claim 1, wherein the first elastic member is a tension spring fixed to at least one of the side walls of the bracket.

3. The clamping hook structure according to claim 2, wherein the two side walls of the bracket are symmetrically arranged with each other, and a top of each side wall has a groove opening upwards for accommodating the crossbar.

4. The clamping hook structure according to claim 3, further comprising:

a clamping member, having a pivot end and a free end, the pivot end is pivotally connected to the bracket through a clamping member pivot disposed between the two side walls, enabling the clamping member to be pivoted between a clamped position and a non-clamped position, wherein the clamping member pivot is parallel to the clamping hook pivot; and a second elastic member, disposed between the clamping member and the bracket for biasing the clamping member to the clamped position;

when the clamping hook is in the locked position and locks the crossbar, the clamping member is blocked by the crossbar and is in the non-clamped position.

5. The clamping hook structure according to claim 4 wherein:

the clamping member has a clamping member abutting portion at its free end, and the clamping hook has a clamping hook abutting portion corresponding to the clamping member abutting portion when the clamping hook is in the unlocked position and release the crossbar, the clamping member is pivoted to the clamped position under biasing of the second elastic member, such that the clamping member abutting portion and the clamping hook abutting portion abut against each other, so as to further hold the clamping hook in the unlocked position.

6. The clamping hook structure according to claim 4, wherein:

when the clamping hook is in the locked position, the first hook portion of the clamping hook protrudes forward onto the opening of the groove, so as to lock the crossbar in the groove.

7. The clamping hook structure according to claim 4, wherein:

when the clamping hook is in the unlocked position, the first hook portion of the clamping hook moves away from the opening of the groove by pivoting of the clamping hook, thereby releasing the crossbar.

8. The clamping hook structure according to claim 5, wherein:

the clamping hook further has a second hook portion being located between the clamping hook pivot and the first hook portion and having a same axial position in respect to the clamping hook pivot as the first hook portion, the second hook portion protrudes forward longer than the first hook portion, and forms with the first hook portion forms a substantially C-shaped accommodating portion for receiving the crossbar, and when the crossbar is placed in the accommodating portion, the crossbar pivots the clamping hook from the unlocked position to the locked position by pressing against the second hook portion.

9. The clamping hook structure according to claim 8, wherein:

the first hook portion and the second hook portion of the clamping hook and the clamping hook abutting portion of the clamping hook are located at different axial positions in respect to the clamping hook pivot, and the clamping member abutting portion and the clamping hook abutting portion are located at a same axial position in respect to the clamping hook pivot.

10. The clamping hook structure according to claim 1, wherein:

the engaging portion is a pin hole for inserting a pin, and the other end of the first elastic member is fixed on the pin.

11. The clamping hook structure according to claim 10, wherein:

the bracket is provided with a pin avoidance portion, such that moving of the pin with pivoting of the clamping hook is not interfered by the bracket.

12. The clamping hook structure according to claim 8, wherein:

the clamping hook is engaged with a sliding member, enabling a sliding of the sliding member to bring the clamping hook to move from the locked position to the unlocked position; and one end of the sliding member opposite to the clamping hook is connected to an operating member, and the operating member is formed as a handle transverse to the sliding member, so as to permit a user to pull the sliding member from the outside of the base through the operating member.

13. The clamping hook structure according to claim 1, wherein:

a third elastic member is further disposed between the bracket and the clamping hook, the third elastic member is a torsion spring biasing the clamping hook to the unlocked position and is sleeved on the clamping hook pivot.

14. A seating device, comprising:

a base, fixed to a car;

a seating portion, detachably fixed to the base;

a rear crossbar, disposed on one of the base and the seating portion; and a rear clamping hook structure, respectively disposed on the other of the base and the seating portion, and capable of engaging with the rear crossbar wherein the rear clamping hook structure is the clamping hook structure according to claim 1, and the crossbar is the rear crossbar.

15. The seating device according to claim 14, further comprising:

a front crossbar, disposed on one of the base and the seating portion; and a front clamping hook structure, disposed on the other of the base and the seating portion, and capable of engaging with the front crossbar wherein the front clamping hook structure includes:

a front bracket, fixed to the other of the base and the seating portion, having two opposite side walls;

a front clamping hook, pivotally connected to the front bracket, so as to be pivoted between a locked position and an unlocked position, when the front clamping hook is in the locked position or the unlocked position, the front clamping hook hooks or releases the front crossbar; and a fourth elastic member, disposed between the front bracket and the front clamping hook, and the fourth elastic member biases the front clamping hook to its unlocked position.

16. The seating device according to claim 15, wherein:

the rear clamping hook structure and the front clamping hook structure are engaged with the same sliding member, and sliding of the sliding member is able to simultaneously bring the clamping hook and the front clamping hook to be pivoted from their respective locked positions to their respective unlocking positions.

17. The seating device according to claim 16, wherein:

in an assembled state, the front clamping hook structure and the rear clamping hook structure are respectively provided by two or more along extending directions of the front crossbar and the rear crossbar, so as to respectively lock the front crossbar and the rear crossbar.

18. The seating device according to claim 14, wherein:

the seating portion is a child car seat or a carrycot.

19. The clamping hook structure according to claim 1, wherein the clamping hook includes a foot portion that is engaged with a sliding member, and a dragging portion extending from one end of the sliding member is engaged with the clamping hook, the dragging portion is connected to the foot portion of the clamping hook, such that when the sliding member moves, the sliding member drives the clamping hook to rotate towards the unlocked position.

20. A clamping hook structure for assembling and connecting a base to a crossbar, the clamping hook structure comprising:

a bracket, fixed to the base, having two opposite side walls;

a clamping hook, pivotally connected to the bracket through a clamping hook pivot disposed between the two side walls, so as to be pivoted between a locked position and an unlocked position, the clamping hook has a first hook portion and an engaging portion located between the first hook portion and the clamping hook pivot, when the clamping hook is in the locked position or the unlocked position, the first hook portion fixes or releases the crossbar; and a first elastic member, one end of the first elastic member is fixed to the bracket, and the other end of the first elastic member is fixed to the engaging portion, thus being able to be displaced between the locked position and the unlocked position as the clamping hook is pivoted;

wherein the engaging portion is a pin hole for inserting a pin, and the other end of the first elastic member is fixed on the pin and the bracket is provided with a pin avoidance portion, such that moving of the pin with pivoting of the clamping hook is not interfered by the bracket.

* * * * *